United States Patent
Piket et al.

(10) Patent No.: US 7,099,458 B2
(45) Date of Patent: *Aug. 29, 2006

(54) DOWNLINK ACTIVITY AND DOUBLE TALK PROBABILITY DETECTOR AND METHOD FOR AN ECHO CANCELER CIRCUIT

(75) Inventors: James B. Piket, Gilbert, AZ (US); Kyle K. Iwai, Chandler, AZ (US); Daniel S. Rokusek, Long Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 131 days.

This patent is subject to a terminal disclaimer.

(21) Appl. No.: 10/735,301

(22) Filed: Dec. 12, 2003

(65) Prior Publication Data

US 2005/0129226 A1 Jun. 16, 2005

(51) Int. Cl.
*H04M 9/08* (2006.01)

(52) U.S. Cl. .................. 379/405.05; 379/406.06; 379/406.01

(58) Field of Classification Search ........... 379/406.01, 379/406.05, 406.06
See application file for complete search history.

(56) References Cited

U.S. PATENT DOCUMENTS

| | | | |
|---|---|---|---|
| 5,268,834 A | 12/1993 | Sanner et al. | |
| 5,274,705 A * | 12/1993 | Younce et al. | 379/406.05 |
| 6,195,430 B1 | 2/2001 | Eriksson et al. | |
| 6,532,454 B1 | 3/2003 | Werbos | |
| 6,718,035 B1 * | 4/2004 | Younce et al. | 379/406.01 |
| 6,868,158 B1 * | 3/2005 | Takahashi et al. | 379/406.04 |

* cited by examiner

Primary Examiner—Jefferey F. Harold
(74) Attorney, Agent, or Firm—Vedder, Price, Kaufman & Kammholz, P.C.

(57) ABSTRACT

A downlink activity and double talk probability detector and method for an echo canceler circuit (10) improves the stability of an echo canceler adaptive filter (300) and improves the attenuation of post-echo canceler uplink data (388). The echo canceler circuit (10) includes a downlink activity and double talk probability data generator (30) and an echo canceler stage (20). The downlink activity and double talk probability data generator (30) receives pre-echo canceler uplink data (40) and downlink data (50) and in response produces double talk probability data (60) and downlink activity data (70). The echo canceler stage (20) receives the downlink data (50), the pre-echo canceler uplink data (40), the double talk probability data (60) and the downlink activity data (70), and in response produces uplink data (80).

26 Claims, 7 Drawing Sheets

DOWNLINK ACTIVITY AND DOUBLE TALK PROBABILITY DETECTOR AND METHOD FOR AN ECHO CANCELER CIRCUIT

FIELD OF THE INVENTION

The invention relates generally to communication systems and more particularly to echo cancelers and echo cancellation methods.

BACKGROUND OF THE INVENTION

Echo in a communication system is commonly characterized as the return of a part of a transmitted signal from an end user back to the originator of the transmitted signal after a delay period. As is known in the art, a near end user transmits an uplink signal to a far end user. Conversely, the near end user receives a downlink signal from the far end user. For example, echo at the near end occurs when the near end user originates an uplink signal on an uplink path, and a part of the transmitted signal is reflected at the far end as an echo signal on a downlink path back to the near end. Echo at the far end occurs when the far end user originates a downlink signal on the downlink path, and a part of the transmitted signal is reflected at the near end as an echo signal on the uplink path back to the far end. The reflection of the transmitted signal may occur due to a number of reasons such as an impedance mismatch in a four/two wire hybrid at the far end or feedback due to acoustic coupling in a telephone, wireless device or hands-free speaker phone. An echo signal corresponding to the delayed transmitted signal is perceived as annoying to the near end user and, in some cases, can result in an unstable condition known as "howling."

Echo cancelers are required at any echo generating source at both the near end and at the far end in an attempt to eliminate or reduce the transmission of echo signals. Echo cancelers may be employed in wireless devices, such as personal data assistants (PDAs), cellular phones, two-way radios, car kits for cellular telephones, car phones and other suitable devices that can move throughout a geographic area. Additionally, echo cancelers may be employed in wireline devices, such as hands-free speaker phones, video and audio conference phones and telephones otherwise commonly referred to in the telecommunications industry as plain old telephone system (POTS) devices. Hands-free speaker phones typically include a microphone to produce the uplink signal, a speaker to acoustically produce the downlink signal, an echo canceler to cancel the echo signal and a telephone circuit.

Echo cancelers attempt to cancel the echo signals produced at the near end when the far end is transmitting by generating echo estimation data corresponding to a portion of an amplified downlink audio signal traveling through the acoustic coupling channel between the speaker and the microphone. The echo canceler models the acoustic coupling channel and in response generates the echo estimation data through the use of an echo canceler adaptive filter. The echo canceler adaptive filter employs a Least Mean Squared (LMS) finite impulse response (FIR) filter or any suitable device or method having a set of weighting coefficients to model the acoustic coupling channel. The echo canceler adaptive filter attempts to subtract the echo estimation data from pre-echo canceler uplink data received by the microphone in order to produce post-echo canceler uplink data. The post-echo canceler uplink data is used by the echo canceler adaptive filter to dynamically update the weighting coefficients of the finite impulse response filter.

The hands-free speaker phone may be integrated into an in-vehicle audio system. The vehicle may be any suitable vehicle, such as an automobile, truck, boat or airplane. The in-vehicle audio system may include an amplifier, speakers and an audio source, such as a tuner circuit, a CD/DVD player, a tape player, a hard drive playback system, a satellite radio, etc. The in-vehicle audio system may be integrated with a communication apparatus, such as a telematics communication device. For example, the telematics communication device may be a component of a General Motors OnStar system. The telematics communication device typically collects and disseminates data, such as location information and audio, such as speech.

Typically, the downlink audio signal received from the far end through the downlink path is played through at least one speaker in the in-vehicle audio system. However, the hands-free speaker phone installed in the vehicle may experience significant coupling between the at least one speaker and the microphone. As a result, an amplified downlink audio signal transmitted through the at least one speaker will be partially received by the microphone as an echo signal.

Echo cancelers operate in response to detecting four possible modes: downlink talking, uplink talking, double talk and idle. During the downlink talking mode, the echo canceler adaptive filter attempts to model the acoustic coupling channel by dynamically adapting the weighting coefficients of the FIR filter. Additionally, pre-processors and post-processors, such as attenuators, may also be used to reduce the effects of the echo signal.

During the uplink talking mode, the echo canceler filter is still active, however, the adaptation is slowed or stopped as there is no downlink or echo signal to model. During the idle mode, the near end user and the far end user is not talking and, therefore, the echo canceler adaptive filter is typically idle. However, during the double talk mode, the pre-echo canceler uplink microphone signal includes both interfering signals and the echo signal. The interfering signals include near end speech, various noise components, and distortion. The various noise components include nonlinearities of the audio system, speaker distortion, air turbulence over the microphone, road noise, wind rumble, turn signal and windshield wiper noises and other noise components. As a result, the echo canceler adaptive filter attempts to adapt to the interfering signals and the echo signal. Consequently, these various noise components may cause the weighting coefficients to diverge, resulting in an incorrect estimation of the acoustic coupling channel, which causes the echo canceler adaptive filter to become less effective or possibly unstable. The adaptive filter under this condition may actually cause the post-echo canceler uplink signal to also become unstable and corrupted. As a result, the corrupted post-echo canceler uplink data will cause annoying loud noises at the far end.

According to one method, the adaptive filter reduces the rate of adaptation once the adaptive filter becomes unstable. The adaptive filter determines instability by comparing the post-echo canceler uplink data with a threshold level. The adaptive filter reduces the rate of filter adaptation in an attempt to reduce the rate of increasing instability of the corrupted uplink signal transmitted on the uplink path. However, the adaptive filter does not reduce the rate of adaptation until after the adaptive filter has already become unstable to some degree. As a result, the uplink signal has already become corrupted because the adaptive filter is already unstable. Further, the mechanism for controlling the rate of adaptation performs poorly in noisy environments because noise may cause the adaptive filter to become so unstable that recovery takes a relatively long time, thus preventing effective communication.

BRIEF DESCRIPTION OF THE DRAWINGS

The present invention is illustrated, by way of example and not limitation, in the accompanying figures, in which like reference numerals indicate similar elements, and in which.

DETAILED DESCRIPTION OF THE PREFERRED EMBODIMENTS

A downlink activity and double talk probability detector and method for an echo canceler circuit improves the stability of an echo canceler adaptive filter and improves the attenuation of post-echo canceler uplink data. The echo canceler circuit includes a downlink activity and double talk probability data generator and an echo canceler stage. The downlink activity and double talk probability data generator receives pre-echo canceler uplink data and downlink data and in response produces double talk probability data and downlink activity data. The echo canceler stage receives the downlink data, the pre-echo canceler uplink data, the double talk probability data, and the downlink activity data, and in response produces uplink data.

Among other advantages, the present invention improves the stability of an echo canceler adaptive filter by dynamically varying the rate of adaptation based on double talk probability data, and downlink activity data. For example, the adaptation rate of an echo canceler adaptive filter varies as a function of the double talk probability data and the downlink activity data such that the echo canceler adaptive filter adapts at a faster rate when there is a high probability that interfering signals are not present. As previously stated, interfering signals include near end speech, various noise components, and distortion. Accordingly, the adaptive filter can respond rapidly to changes in the acoustic coupling channel under favorable conditions (i.e., a low probability of interfering signals). Conversely, the echo canceler adaptive filter would adapt at a slower rate as the probability that interfering signals are present increases. As previously stated, as the level of near end speech or background noise begins to increase, then the level of the interfering noise begins to increase. As a result, as the echo signal becomes relatively stronger than the near end speech and the background noise, then the downlink activity data will indicate an increased probability of downlink activity. For example, as the probability of the presence of an interfering signal increases, the double talk probability data will indicate a higher likelihood of the occurrence of the probability of double talk. According to one embodiment, the rate of filter adaptation varies as a function of the probability of the presence of interfering signals. For example, if the rate of adaptation is reduced, then the probability that the adaptive filter will diverge is significantly reduced. Therefore, the rate of adaptation may be reduced in order to reduce divergence of the adaptive filter as the likelihood of the presence of an interfering signal increases.

Figure 1:
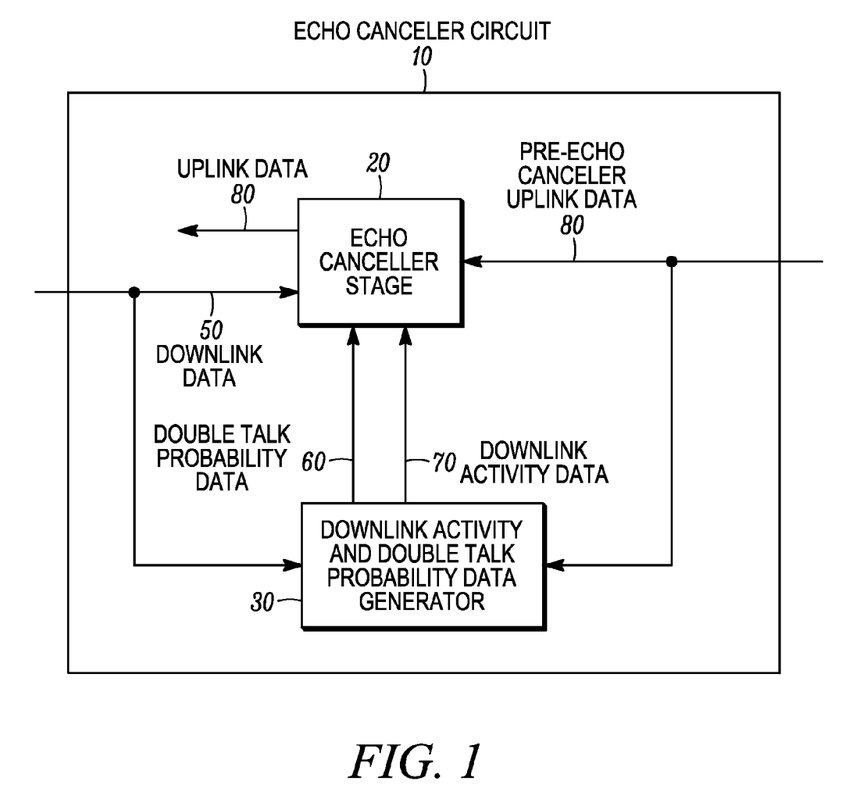
FIG. 1 is a block diagram illustrating one example of an echo canceler circuit according to one embodiment of the invention.

FIG. 1 is a block diagram of an echo canceler circuit 10 for controlling the rate of adaptation of an adaptive filter and the level of attenuation of an attenuator according to one embodiment of the present invention. The echo canceler circuit 10 may be one or more suitably programmed processors such as a microprocessor, a microcontroller, or a digital signal processor (DSP), and therefore includes associated memory that contains executable instructions that, when executed, causes the echo canceler's circuit 10 to carry out the operations described herein. In addition, the echo canceler circuit 10, as used herein, may include discrete logic, state machines, or any other suitable combination of hardware, software, middleware, and/or firmware.

The echo canceler circuit 10 includes the echo canceler stage 20 and a downlink activity and double talk probability data generator 30. The echo canceler circuit 10 may be employed in an analog or digital modem in a telecommunications system as is known in the art. The various links shown in FIG. 1 may be any suitable mechanism for conveying electrical signals or data as appropriate.

Figure 2:
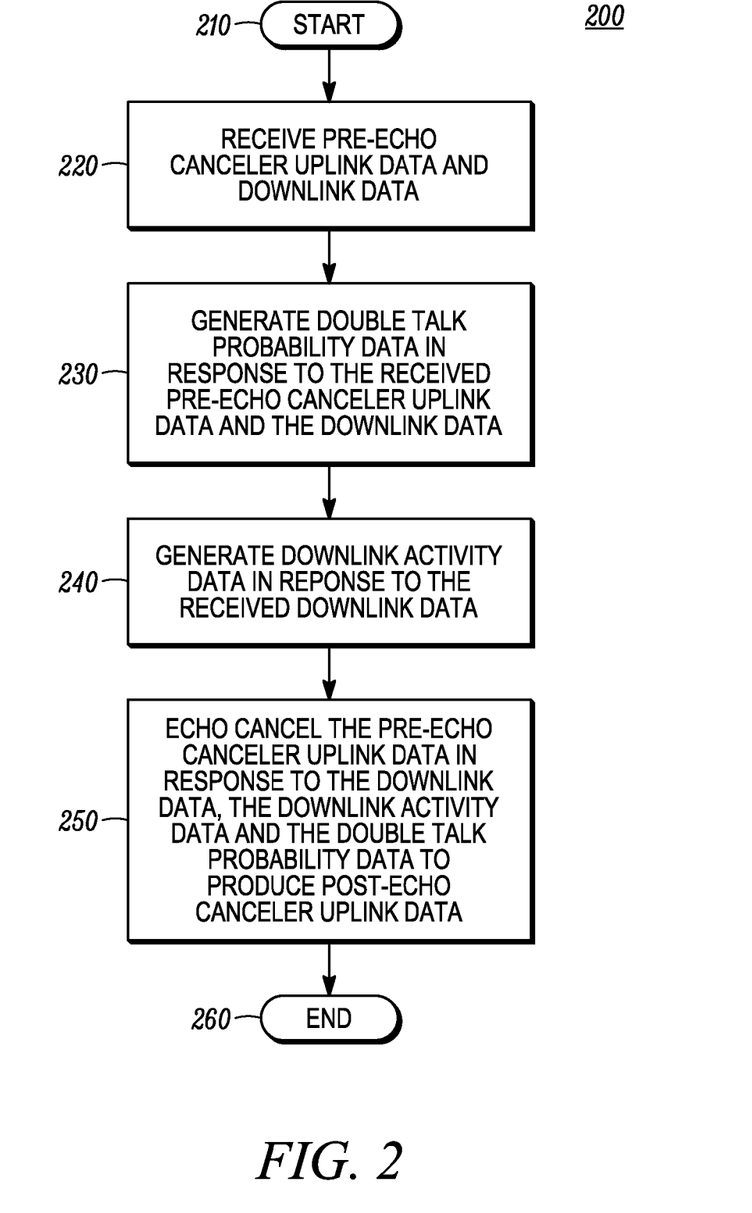
FIG. 2 is a flowchart illustrating one example of a method for generating downlink activity and double talk probability data according to one embodiment of the invention.

FIG. 2 illustrates a method 200 for generating double talk probability data 60 and downlink activity data 70 according to one embodiment of the invention. The method 200 may be carried out by the echo canceler circuit 10 with respect to FIG. 1. However, any other suitable structure may also be used. It will be recognized that method 200, beginning with step 210, will be described as a series of operations, but the operations may be performed in any suitable order and may be repeated in any suitable combination.

As shown in step 220, the downlink activity and double talk probability data generator 30 and the echo canceler stage 20 receives pre-echo canceler uplink data 40 and downlink data 50. The downlink activity and double talk probability data generator 30 may calculate a power level, an energy level or an amplitude level as appropriate for the pre-echo canceler uplink data 40 and for the downlink data 50 in order to produce the double talk probability data 60 and the downlink activity data 70. For example, the pre-echo canceler uplink data 40 and the downlink data 50 may include one or more speech frames such that the power level, energy level or amplitude level may be determined over a suitable period of time. For example, the downlink activity and double talk probability data generator 30 may calculate the power level, energy level or amplitude level over one or more speech frames based on an average, or any other suitable function. According to one example, a speech frame may span a period of 20 milliseconds, corresponding to 160 samples at 8,000 samples per second. The speech frame may correspond to any suitable period of time and any suitable number of samples and at any suitable sampling rate.

As shown in step 230, the downlink activity and double talk probability data generator 30 generates double talk probability data 60 in response to the received pre-echo canceler uplink data 40 and the downlink data 50. As shown in step 240, the downlink activity and double talk probability data generator 30 generates downlink activity data 70 in response to the received downlink data 50. The downlink activity and double talk probability data generator 30 may analyze the pre-echo canceler uplink data 40 and the downlink data 50 to produce the double talk probability data 60 based on a probability density function that relates the detection of the received downlink data 50, near end speech, background noise, and near end speech, resulting in a probability of double talk activity. According to one embodiment, the probability density function utilized in the downlink activity and double talk probability data generator 30 is optimized such that the resulting double talk probability data 60 is not overly sensitive to providing a false indication of double talk activity due to the presence of background noise or an echo signal. Additionally, the downlink activity and double talk probability data generator 30 is optimized such that the detection of near end speech is sufficiently sensitive and accurate such that the rate of adaptation may be controlled by one or more parameters of the echo canceler stage 20 to prevent the divergence of an echo canceler adaptive filter, as will be discussed in more detail below.

Figure 3:
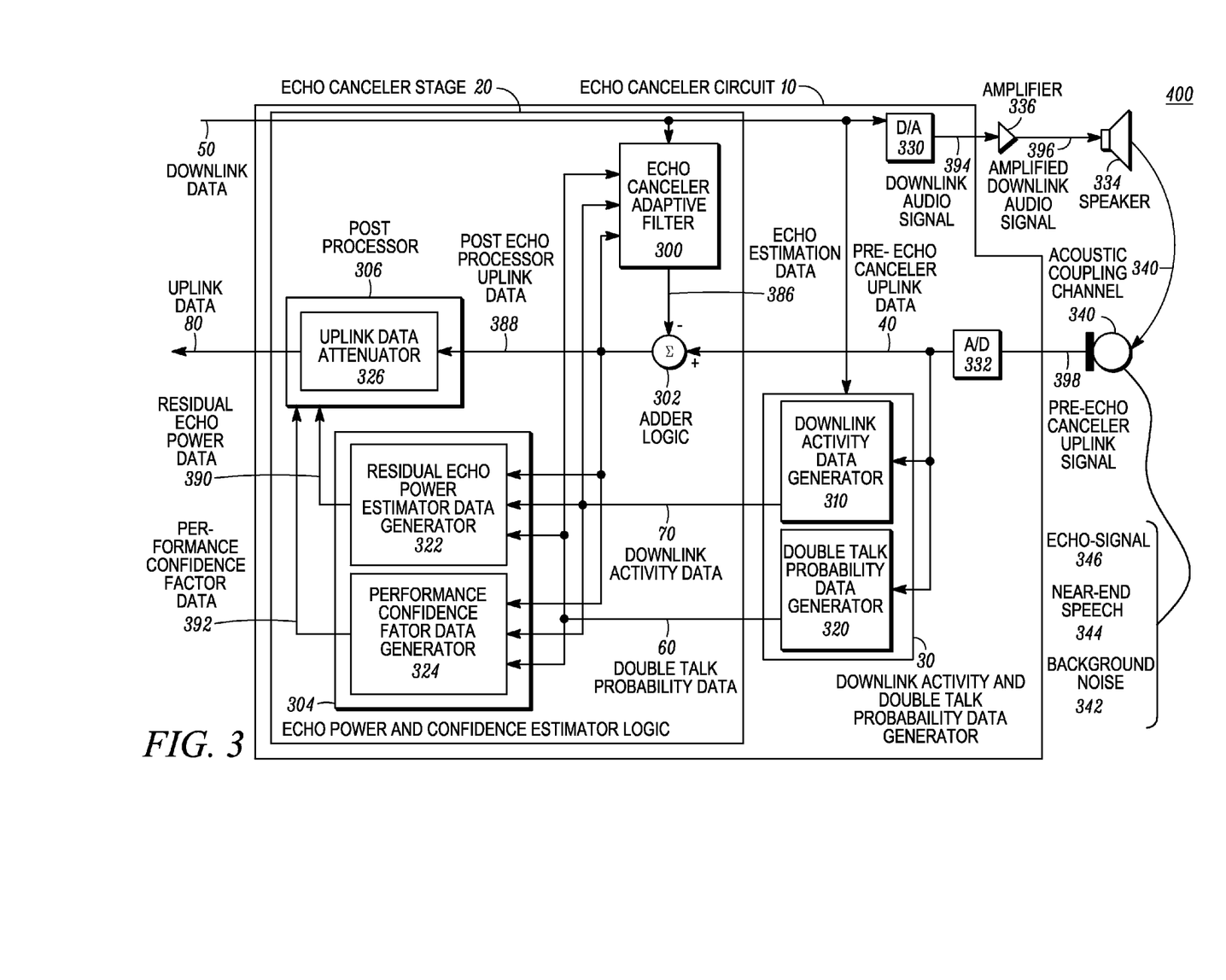
FIG. 3 is a block diagram illustrating another example of the echo canceler circuit according to another embodiment of the invention.

FIG. 3 is a block diagram of the echo canceler circuit 10 of FIG. 1 shown in more detail. The echo canceler circuit 10 includes the echo canceler stage 20 and the downlink activity and double talk probability data generator 30. The echo canceler circuit 10 may compensate for the effects of acoustic echo coupling between a microphone and a speaker or to compensate for reflections at a near end due to an impeded mismatch such as a mismatch with a network hybrid circuit as is known in the art.

The echo canceler circuit 10 includes a digital to analog converter 330 and an analog to digital converter 332. The digital to analog converter 330 receives the downlink data 50 and in response produces a downlink audio signal 394. The digital to analog converter 330 is coupled to a speaker 334 via an amplifier 336. The amplifier 336 is coupled to the digital to analog converter 330 and receives the downlink audio signal 394 and in response produces an amplified downlink audio signal 396. The speaker 334 then acoustically transmits the amplified downlink audio signal 396.

The microphone 330 receives the pre-echo canceler uplink signal 40 that includes for example, an echo signal 346, near end speech 344 and background noise 342. The analog to digital converter 332 is coupled to a microphone 338. The microphone 338 receives at least a portion of the amplified downlink audio signal acoustically produced by speaker 334 and in response produces the pre-echo canceler uplink signal 398. The analog to digital converter 332 is coupled to the microphone 338 and receives the pre-echo canceler uplink signal 398 and in response produces the pre-echo canceler uplink data 340. The analog to digital converter 332 provides the pre-echo canceler uplink data to the adder logic 302, the downlink activity data generator 310 and the double talk probability data generator 320.

The echo canceler stage 20 further includes and echo canceler adaptive filter 300, adder logic 302, echo power and confidence estimator logic 304 and a post-processor 306. The downlink activity and double talk probability data generator 30 includes a downlink activity data generator 310 and a double talk probability data generator 320. The post-processor 306, according to one embodiment, includes an uplink data attenuator 326. The echo canceler adaptive filter 300 is coupled to the downlink activity and double talk probability data generator 30 to receive the double talk probability data 60, the downlink activity data 70 and the downlink data 50, and in response to dynamically vary a rate of echo cancellation adaptation. The echo canceler adaptive filter 300 receives downlink data 50, double talk probability data 60 and downlink activity data 70 and in response produces echo estimation data 386. The adder logic 302 receives the pre-echo canceler uplink data 40 and the echo estimation data 386, and then produces post-echo canceler uplink data 388.

The echo power and confidence estimator logic 304 is coupled to the downlink activity and double talk probability data generator 30 and to the uplink data attenuator 326. The echo power and confidence estimator logic 304 receives the downlink activity data 70 and the double talk probability data 60, and in response produces residual echo power data 390 and performance confidence factor data 392 and in response attenuates the post-echo canceler uplink data 388 to produce the uplink data 80. The echo power and confidence estimator logic 304 further includes a residual echo power estimator data generator 322 and a performance confidence factor data generator 324.

The downlink activity data generator 310 receives the pre-echo canceler uplink data 40, and in response produces downlink activity data 70. The double talk probability data generator 320 receives the pre-echo canceler uplink data 40, and in response produces the double talk probability data 60.

Figure 4:
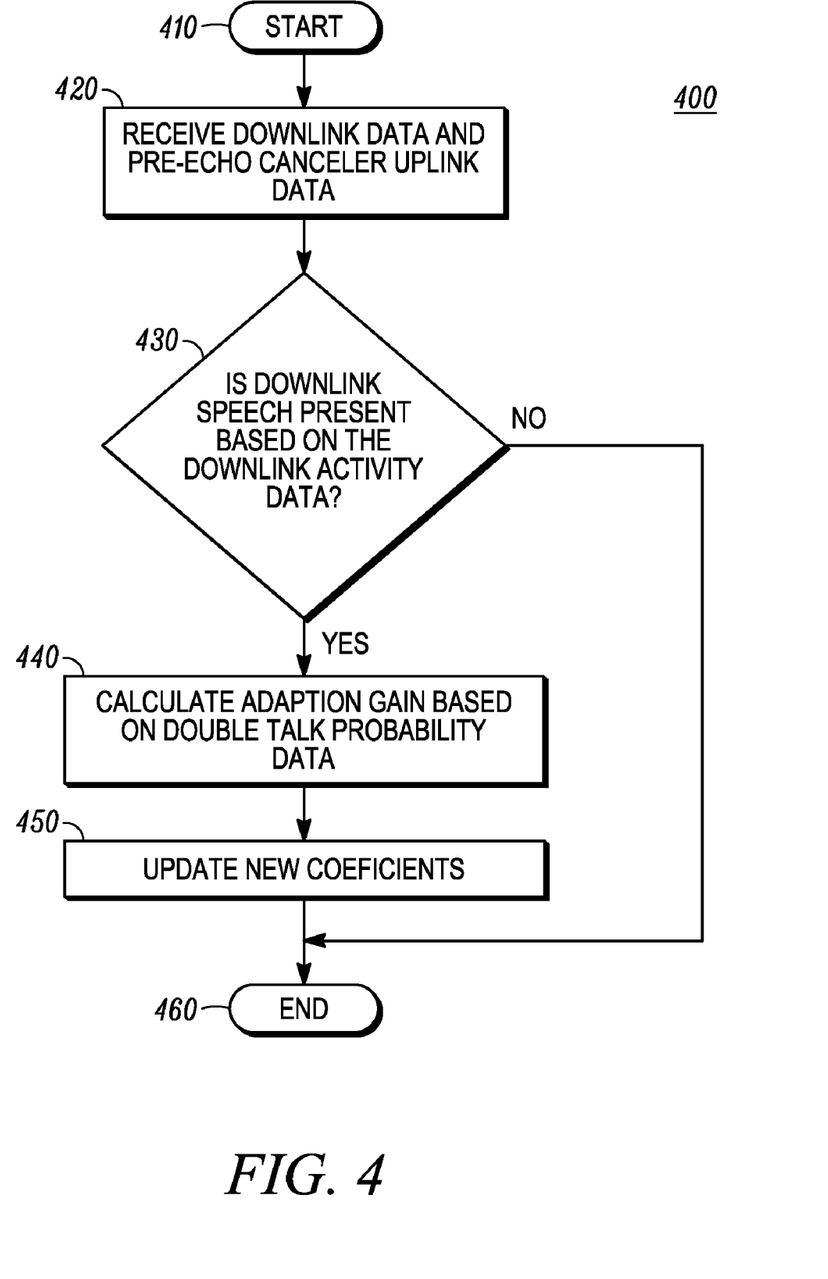
FIG. 4 is a flowchart illustrating another example of a method for controlling an echo canceller adaptive filter according to one embodiment of the invention.

FIG. 4 illustrates a method 400 for controlling the rate of adaptation for echo canceler adaptive filter 300 according to one embodiment of the invention. The method 400 may be carried out by the echo canceler adaptive filter 300 as shown in FIG. 3. However, any other suitable structure may also be used. It will be recognized that the method 400, beginning with step 410, will be described as a series of operations, but the operations may be performed in any suitable order and may be repeated in any suitable combination. Furthermore, although method 400 ends with step 460, method 400 may loop back to step 410 or at any other suitable step.

As shown in step 420, both the echo canceler stage 20 and the downlink activity and double talk probability data generator 30 receive the downlink data 50 and the pre-echo canceler uplink data 40 as described with respect to step 220 previously described with respect to FIG. 2.

As shown in step 430, the downlink activity data generator 310 determines if downlink speech is present in response to the downlink data 50 and optionally the pre-echo canceler uplink data 40. As previously stated, the downlink activity data generator 310 receives the downlink data 50 and the pre-echo canceler uplink data 40 and in response produces the downlink activity data 70.

As shown in step 440, if the downlink activity data 70 indicates that downlink speech is present, or alternatively a sufficiently high level of probability exists that downlink activity is present, then the echo canceler adaptive filter 300 calculates an adaptation gain based on the double talk probability data 60. An adaptation rate that varies as a function of the double talk probability data 60 results in a faster adaptation rate when there is a high confidence that interfering signals are not present as represented by the double talk probability data. Similarly, the echo canceler adaptive filter 300 may slow or reduce the rate of adaptation as the probability of the presence of interfering signal increases as represented by the double talk probability data 60. Accordingly, while a faster rate of adaptation allows the echo canceler adaptive filter 300 to compensate for rapid changes in the acoustic coupling channel 340 during a downlink speech mode, it also leads to faster divergence of the echo canceler adaptive filter 300 in the presence of interfering signals. Accordingly, the echo canceler adaptive filter 300 can respond rapidly to changes in the acoustic coupling channel 340 during a downlink speech condition, while limiting the rate of divergence as the probability of the presence of interfering signals increases as represented by the double talk probability data 60.

According to one embodiment, beyond a certain threshold where there is a high probability that interfering signals are present, the rate of adaptation for the echo canceler adaptive filter 300 may be further reduced or stopped in order to reduce or prevent further divergence. The interfering signals may have been present before the echo canceler adaptive filter 300 determined that a high probability of interfering signals existed as represented by the double talk probability data 60. As a result, the calculation of the adaptive filter weights may have already started to diverge. Although the rate of adaptation of the echo canceler adaptive filter 300 may have been reduced, it is possible that the echo canceler adaptive filter 300 will have diverged slightly. As a result, a set of weighting coefficients that were calculated before the likely onset of interfering signals may be used in order to ensure the echo canceler adaptive filter 300 remains stable. According to this embodiment, otherwise known as bank switching, the echo canceler adaptive filter 300 stores previous values of weighting coefficients such as previous values previously calculated at previous points in time. For example, the echo canceler adaptive filter 300 may include one, two, three, four or more sets of memories or memory locations storing the previously generated weighting coefficients. Accordingly, the echo canceler adaptive filter 300 may determine or estimate the time period for which the last known set of good weighting coefficients exists. The echo canceler adaptive filter 300 may then reload these previously generated weighting coefficients that were generated for a last known condition. Accordingly, the echo canceler adaptive filter 300 may go back in time, at an appropriate point, in order to reload the last known good set of weighting coefficients. However, if the onset of near end speech 344 and background noise 342 occurs relatively quickly, then the echo canceler adaptive filter 300 may not need to go back in time very far, since the last known good set of weighting coefficients may have been generated relatively recently. For example, above a probability of double talk threshold, e.g., 30 percent, 40 percent, the echo canceler adaptive filter 300 may select an appropriate set of previously stored weighting coefficients to be reloaded. The determination of reloading the last known good set of weighting coefficients previously generated and the determination of how far back in time is most appropriate may be based on a probability of threshold level associated with the double talk probability data 60, or based on a suitable probability density function.

According to one embodiment, the echo canceler adaptive filter 300 reduces the rate of echo cancellation adaptation in response to the downlink activity data 70 and the double talk probability data 60. For example, the echo canceler adaptive filter 300 may slow coefficient weighting adaptation when the confidence in the double talk probability data 60 is low in order to reduce the likelihood that the background noise 342 or near end speech 344, causes divergence in the echo canceler adaptive filter 300, and therefore reduces the likelihood of producing corrupted post-echo canceler uplink data 388. Accordingly, the downlink activity and double talk probability data generator 30 accurately detects the presence of background noise 342 and near end speech 344 so that measures may be taken to avoid causing the echo canceler adaptive filter 300 to become less effective or possibly unstable. The downlink activity and double talk probability data generator 30 distinguishes between the echo signal 346 caused by the acoustic coupling channel 340 between the speaker 334 and the microphone 338, and near end speech 344 causing the double talk condition, and background noise 342. Accordingly, the downlink activity and double talk probability data generator 30 avoids misinterpreting the background noise 342 or the near end speech 344 as the echo signal 346 so that the echo canceler adaptive filter 300 does not become less effective or possibly unstable. Conversely, the downlink activity and double talk probability data generator 30 accurately detects the presence of near end speech 344 as opposed to the echo signal 346 in order to accurately attenuate the pre-echo canceler uplink data 40 so that residual echo in the post-echo canceler uplink data 388 is not noticed by the near end user. Additionally, coefficient weighting adaptation in the echo canceler adaptive filter 300 may be slowed down if there is a small probability of double talk in order to avoid divergence. For example, there may be little harm in slowing coefficient weighting adaptation unnecessarily; however, performing coefficient weighting adaptation in the presence of near end speech 344 or excessive background noise 342 may cause divergence and the generation of corrupted post-echo canceler uplink data 388 to be transmitted on the uplink path.

According to one embodiment, the rate of echo cancellation adaptation is controlled in response to an adaptation gain based on at least the double talk probability data 60. For example, the weighting coefficients of the echo canceler adaptive filter 300 may establish an adaptation gain. As is known in the art, the rate of convergence and divergence of the echo canceler adaptive filter 300 depends on, among other elements, primarily the adaptation gain. According to one embodiment, the gain may be normalized to unity such that the gain varies from between 0 and 1. Accordingly, the threshold levels for adjusting the adaptation gain may be determined based on the state of the echo canceler circuit 10, i.e., downlink only mode, double talk mode, idle mode and uplink only mode. For example, the adaptation gain during the downlink only mode may be set at a gain of 0.5. However, the adaptation gain may vary within any suitable range such as between 0.25 and 0.75, or any other suitable range that is either larger or smaller. During the double talk mode or the downlink mode, the adaptation gain may be set to 0, or a relatively small number such as 0.05. Accordingly, during the double talk mode or the idle mode, the adaptation gain is set to 0 such that the weighting coefficients are not substantially updated since the presence of interfering signals such as near end speech 344 is very high. Finally, during the uplink only mode, the adaptation gain is similarly set to 0 in order to prevent the echo canceler adaptive filter 300 from diverging since it is highly likely that the presence of near end speech 344 exists.

According to one embodiment, the rate of echo cancellation adaptation is dynamically varied in response to an adaptation gain according to the following equation:

adaptation gain=*f*(1−double talk probability data)

Accordingly, a table or a probability density function may be established based on the double talk probability data and the downlink activity data 70 in order to establish an appropriate adaptation gain.

As previously stated, the post processor 306 may include the uplink data attenuator 326. The post processor 306 may be one or more suitably programmed processors such as a microprocessor, a microcontroller or a digital signal processor and therefore includes associated memory that contains executable instructions that when executed causes the post processor 306 to carry out the operations described herein. Alternatively, as used herein, post processor 306 includes discrete logic, state machines or any other suitable combination of hardware, software and/or firmware. The memory may be, for example, random access memory (RAM), read only memory (ROM), optical memory or any other suitable storage medium located locally or remotely such as via a server. Additionally, the memory may be accessible by a wireless wide area network (WWAN), a wide area network (WAN), a local area network (LAN), and a wireless local area network (WLAN), an IEEE802.11 wireless network, a Bluetooth network, or any suitable communication interface or network.

Figure 5:
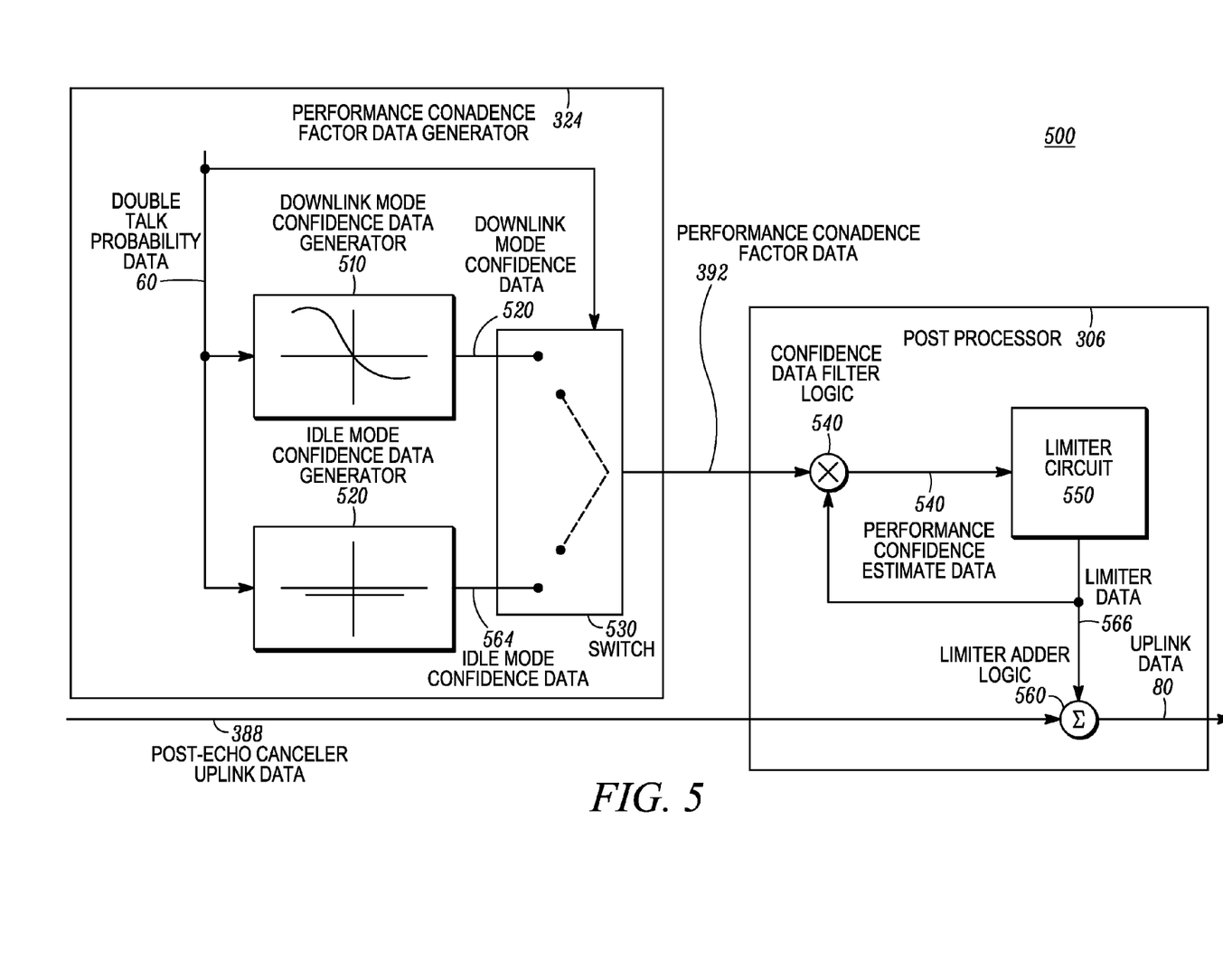
FIG. 5 is a block diagram illustrating one example of a method for controlling the echo canceler circuit in response to performance confidence factor data according to one embodiment of the invention.

FIG. 5 is a block diagram of one example of the performance confidence factor data generator 324 and the post processor 306 according to one embodiment of the invention. The performance confidence factor data generator 324 includes a downlink mode confidence data generator 510, an idle mode confidence data generator 520 and a switch 530. The post processor 306 includes confidence data multiplier logic 540, a limiter circuit 550 and limiter adder logic 560.

During the double talk mode, the downlink mode confidence data generator 510 receives the double talk probability data 60 and in response provides downlink mode confidence data 562 to switch 530. Accordingly, the switch 530 produces the performance confidence data 392 in response to the downlink mode confidence data 562. During the idle mode, the idle mode confidence data generator 520 receives the double talk probability data 60 and in response provides idle mode confidence data 564 to switch 530. Accordingly, the switch 530 produces the performance confidence data 392 in response to the idle mode confidence data 564 The decision logic is based on activity detection and is built into the confidence data and switch modules. This confidence factor may be derived heuristically and serves to refine the estimate of how effective the current adaptive filter coefficient weights are at modeling and canceling the echo signal. For example, during periods of downlink single-talk associated with a low probability of double talk, the echo canceller adaptive filter 300 can be generally observed to be quite accurate and the confidence factor is increased. Conversely, extended periods with a high-probability of double talk indicate that the echo canceller adaptive filter 300 has not been able to substantially update its weighting coefficients and can generally observed to have reduced accuracy due to variance in the echo path and interfering signals. During these periods, the performance confidence factor data would then indicate a lower level of confidence. This confidence factor provides a unique method of refining echo canceller performance estimation and can be subsequently used to influence the suppression or clipping used in post processing stages to ensure to residual echo is transmitted.

The multiplier logic 540 receives the performance confidence data 392 and limiter data 566 and in response produces performance confidence estimate data 568. The limiter circuit 550 receives the performance confidence estimate data 568 and in response produces the limiter data 566. The limiter adder logic 560 receives the post-echo canceler uplink data 388 and the limiter data 566 and in response produces the uplink data 80.

Figure 6:
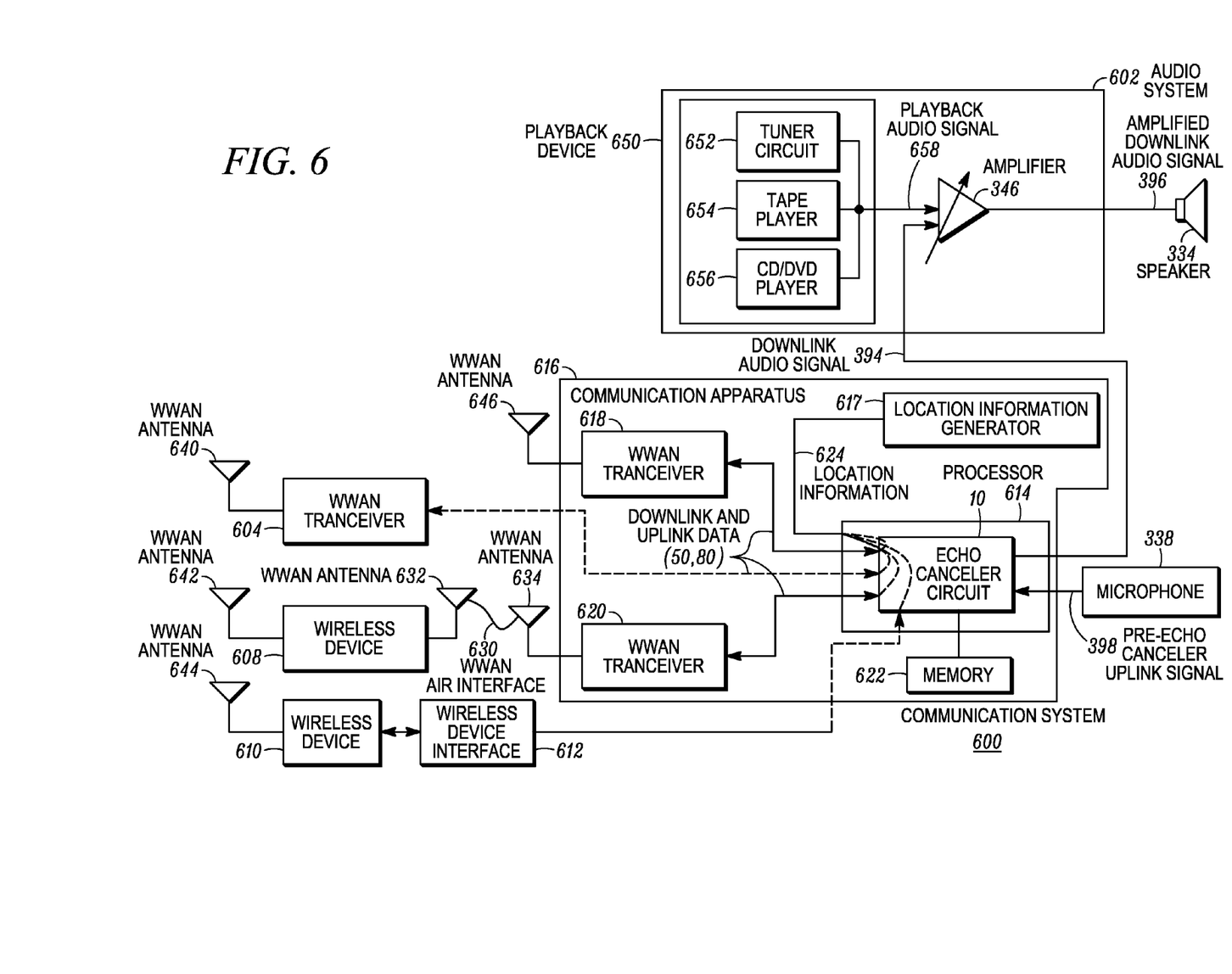
FIG. 6 is a block diagram illustrating an example of a communication system according to one exemplary embodiment of the invention.

FIG. 6 is a block diagram of a communication system 600 according to one exemplary embodiment of the invention. The communication system 600 includes a communication apparatus 616, such as a telematics communication device, an audio system 602, the at least one speaker 334, the microphone 338, a wireless wide area network (WWAN) transceiver 604, a WWAN antenna 640, 644, 646, a wireless device 608, 610, a WLAN antenna 632, 634, and a wireless device interface 612.

The communication apparatus 616 further includes a processor 614, a location information generator 617, a WWAN transceiver 618, a WLAN transceiver 620 and a memory 622. According to one embodiment, the location information generator 617 produces location information 624 and provides the location information 624 to processor 614. The processor 614, in response to receiving the location information 624, retransmits the location information 624 to an appropriate transceiver, such as the WWAN transceiver 618, 604, and the wireless device 608, 610. The processor 614 includes the echo canceler circuit 10. The echo canceler circuit 10 may be coupled to one or more of: the WWAN transceiver 618, the WWAN transceiver 604, the wireless device 608 or the wireless device 610. For example, the WWAN transceivers 618 and 604 may represent any one of a number of wireless devices such as, for example, an in-vehicle mobile phone, a portable cellular phone, a wireless personal digital assistant, a wireless fidelity device (WiFi, i.e., a device based on the IEEE802.11 specification) or any suitable communication device. According to one embodiment, the WWAN transceiver 604 may be external to the communication apparatus 616 and therefore the echo canceler circuit 10 may be coupled to the WWAN transceiver 604 via an appropriate link, such as a wired cable as is known in the art. According to another embodiment, the WLAN transceiver 620 may be integrated into the communication apparatus 616.

The wireless local area network transceiver 620 may be a Bluetooth compliant device or a wireless fidelity device (WiFi, ie., a device based on the IEEE802.11 specification) or any suitable communication device. For example, the WWAN transceiver 620 may interface with the wireless device 608 via a WLAN air interface 630, WWAN antenna 632 and WLAN antenna 634. The WWAN transceiver 604, 618 and the wireless device 608, 610 may communicate with the cellular telephone system via WWAN antennas 640, 642, 644, 646.

The wireless device 608, 610 may be a cellular phone, a personal digital assistant equipped with a wireless interface, or a portable computer also equipped with a WWAN interface. Wireless device 608 and WWAN transceivers 604, 618, 620 may communicate with a wireless wide area network such as a cellular telephone system suitable for communicating with a public switching telephone network (PSTN). Accordingly, the wireless device 608, 610 and WWAN transceivers 618, 604, 620 may communicate with a cellular telephone system according to any known or future wireless standard, such as for example code division multiple access (CDMA), time division multiple access (TDMA), advanced mobile phone standard (AMPS) or group special mobile (GSM), including any current and future protocols such as the third generation (3G) and higher, wireless communication protocols.

The communication apparatus 616 according to one embodiment includes a housing containing the processor 614, the WWAN transceiver 618, the WLAN 620 and the location information generator 617. Additional or fewer components may be included in the communication apparatus 616 other than those described above. As is known in the art, the processor 614, the WWAN transceiver 618, the WLAN transceiver 620 and the location information generator 617 may each be manufactured as separate circuit boards or integrated circuit chips from one or more manufacturers. The circuit boards may be interconnected as required through the use of a motherboard, a flat or nonflat flexible multiconductor cable, a multiconductor wired cable or any suitable type of interconnection device. Each circuit board may be attached or coupled either directly or indirectly to the housing or to other circuit boards via a suitable fastening device as is known in the art, such as a connector, a clamp, a clip, a screw, or a nut and a bolt. The integrated circuit chips may be interconnected as required via a circuit board, a multi-circuit chip carrier, a flat flexible multiconductor cable, a multiconductor wired cable or any suitable type of interconnection device. The circuit boards and integrated circuit chips may be mounted using chemical bonding such as an adhesive or any suitable fastening device.

According to one embodiment, the communication apparatus 616 housing may include: a circuit board comprising the processor 614 and memory 622, a circuit board comprising the WWAN transceiver 618, and a circuit board comprising the WLAN transceiver 620. The circuit boards may be interconnected and attached or coupled to the housing either directly or indirectly as previously discussed. Additionally, the communication apparatus 616 housing may include connectors for coupling to external components such as the audio system 602, the microphone 338, WWAN antenna 646, WLAN antenna 634, WWAN 604 or any other suitable device. For example, the communication apparatus 616 may interface with other suitable components not described herein. The connectors may be any suitable device for interconnecting the communication apparatus 616 to any external components such as a wired cable, a fiber-optic link or a radio frequency interface.

According to one embodiment, the communication apparatus 616 is a telematics communication module supporting the collection and dissemination of data, including audio speech. For example, the telematics communication module may be based on General Motors' OnStar System, which automatically calls for emergency assistance if the vehicle is in an accident. According to another embodiment, the communication apparatus 616 also can perform such functions as remote engine diagnostics, tracking stolen vehicles and providing roadside assistance, as well as other functions.

The communication apparatus 616, according to one embodiment, refers to a telematics communication device supporting the collection and dissemination of data, including audio speech. According to one embodiment, the communication apparatus 616 includes, for example, emergency assistance provided based on General Motor's OnStar system which automatically calls for assistance if the vehicle is in an accident. According to another embodiment, the communication apparatus 616 also can perform such functions as remote engine diagnostics, tracking stolen vehicles, and providing roadside assistance as well as other functions.

Audio system 602 includes a playback stage 650 and the amplifier 346. The playback stage 650 further includes a tuner circuit 652, a tape player 654 and a CD/DVD player 656. The playback device 650 produces a playback audio signal 658 in accordance with a selected device such as the tuner circuit 652, the tape player 654 and the CD/DVD player 656 to produce the playback audio signal 658. The amplifier 346 receives the playback audio signal 658 and the downlink audio signal 394 and in response produces the amplified downlink audio signal 396. The amplifier 346 may select between the playback audio signal 658, the downlink audio signal 394 or a combination of the playback audio signal 658 and the downlink audio signal 394. As previous discussed, speaker 334 acoustically transmits amplified downlink audio signal 396.

Figure 7:
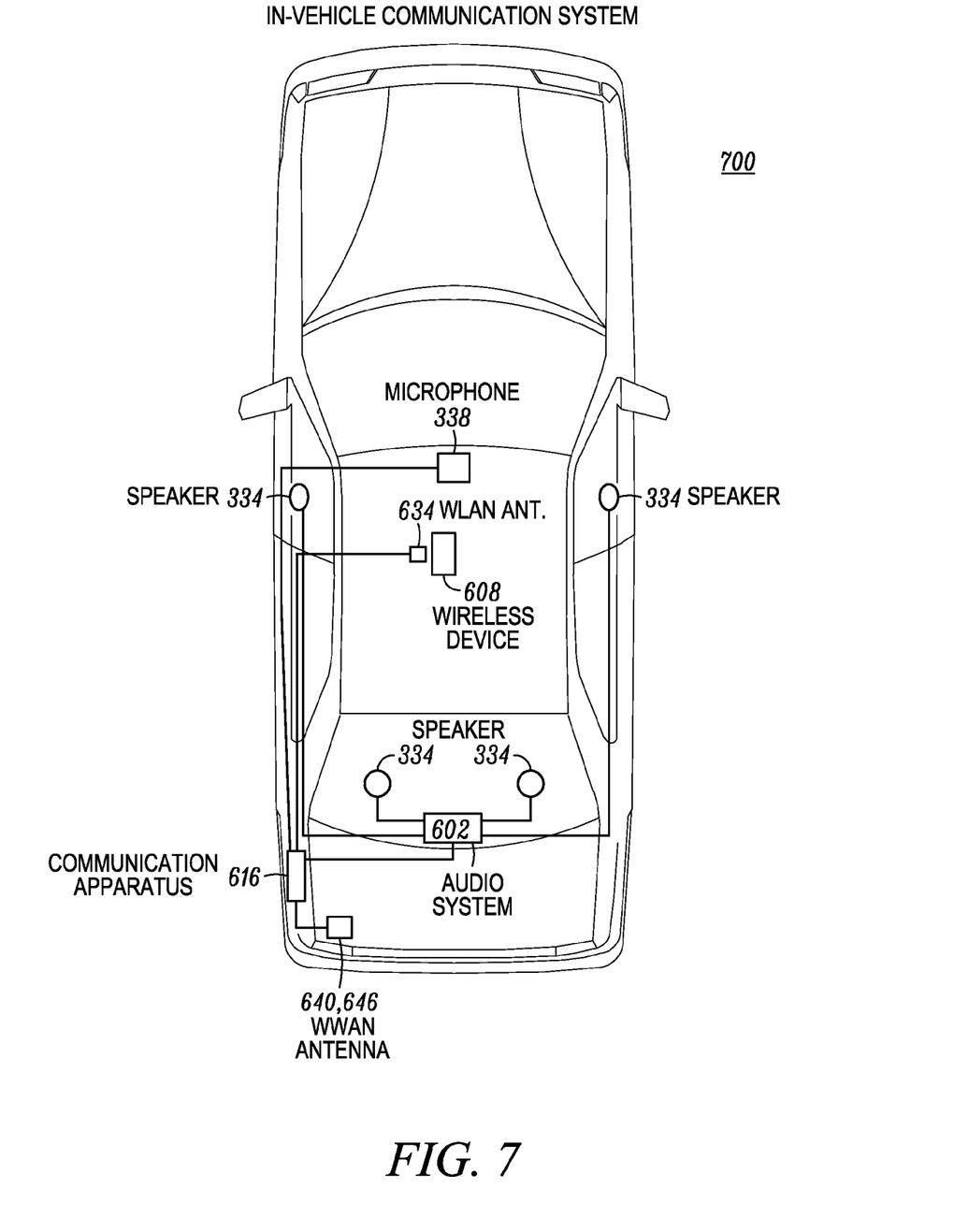
FIG. 7 is a block diagram of an in-vehicle communication system according to one exemplary embodiment of the invention.

FIG. 7 is a block diagram of an in-vehicle communication system 700 according to at least one embodiment of the invention. The in-vehicle communication system 700 includes the communication apparatus 616 coupled to the wireless device 608 via the wireless local area network transceiver 620 and the wireless local area network antennas 632, 634. For example, the wireless local area network transceiver 620 may be a Bluetooth interface as previously discussed. Alternatively, the communication apparatus 616 may interface with the wireless device 610 via the wireless device interface 612 through a hard wire connection via a wireless device cradle. According to one embodiment, the communication apparatus 616 within the in-vehicle communication system 600 may include a wireless wide area network transceiver 618, or alternatively it may include the wireless wide area network transceiver 618 that is integrated into the communication apparatus 616 as shown previously with respect to FIG. 6. Alternatively, the communication apparatus 616 may interface with the wireless wide area network 604 externally to the communication apparatus 616 and may be mounted in any suitable location within the vehicle. For example, although the audio system 602 and the communication apparatus 616 are shown in the trunk area of the vehicle, the communication apparatus 616 and/or the audio system 602 may be located in any suitable location, including inside the dashboard or under the dashboard or integrated within a radio within the dashboard of the vehicle. According to one embodiment, the vehicle's radio system may include the audio system 602, the communication apparatus 616 and any necessary transceiver 618, 620.

Among other advantages, the present invention improves the stability of the echo canceler adaptive filter 300 by dynamically varying the rate of adaptation based on double talk probability data 60 and downlink activity data 70. For example, the adaptation rate of the echo canceler adaptive filter 300 varies as a function of the double talk probability data 60 and the downlink activity data 70 such that the echo canceler adaptive filter 300 adapts at a faster rate when there is a high probability that interfering signals are not present. As previously stated, interfering signals include near end speech 344, various noise components, and distortion. Accordingly, the echo canceler adaptive filter 300 can respond rapidly to changes in the acoustic coupling channel 340 under favorable conditions (i.e., a low probability of interfering signals). Conversely, the echo canceler adaptive filter 300 may adapt at a slower rate as the probability that interfering signals are present increases. As previously stated, as the level of near end speech begins to increase, then the level of the interference begins to increase. As a result, as the near end speech 344 becomes relatively stronger than the echo signal 346, then the double talk probability data 70 will indicate an increased chance of double talk. For example, as the probability of the presence of an interfering signal increases, the double talk probability data 60 will indicate a higher likelihood of the occurrence of the probability of double talk. According to one embodiment, the rate of filter adaptation varies as a function of the probability of the presence of interfering signals. For example, if the rate of adaptation is reduced, then the probability that the echo canceler adaptive filter 300 will diverge is significantly reduced. Therefore, the rate of adaptation may be reduced in order to reduce divergence of the adaptive filter as the likelihood of the presence of an interfering signal increases.

It is understood that the implementation of other variations and modifications of the invention and its various aspects will be apparent to those of ordinary skill in the art and that the invention is not limited by the specific embodi-

What is claimed is:

1. An echo canceller circuit comprising:
a downlink activity and double talk probability data generator operative to receive pre-echo canceler uplink data and downlink data, and in response to produce double talk probability data and downlink activity data; and
an echo canceler stage, operatively coupled to the downlink activity and double talk probability data generator, and operative to receive the downlink data, the pre-echo canceler uplink data, the double talk probability data, and the downlink activity data, and in response to produce uplink data.

2. The echo canceler circuit of claim 1 wherein the echo canceler stage includes an echo canceller adaptive filter operatively coupled to the downlink activity and double talk probability data generator, and operative to receive the double talk probability data, the downlink activity data and the downlink data, and in response to dynamically vary a rate of echo cancellation adaptation.

3. The echo canceler circuit of claim 2 wherein the rate of echo cancellation adaptation is controlled in response to an adaptation gain based on at least the double talk probability data.

4. The echo canceler circuit of claim 1 wherein the echo canceler stage further includes:
adder logic operative to receive the pre-echo canceler uplink data and echo estimation data, and in response to produce post-echo canceler uplink data;
echo power and confidence estimator logic, operatively coupled to the downlink activity and double talk probability data generator, and operative to receive the downlink activity data and the double talk probability data, and in response, to produce residual echo power data and performance confidence factor data; and
an uplink data attenuator, operatively coupled to the adder logic and the echo power and confidence estimator logic, and operative to receive the post-echo canceler uplink data, the residual echo power data and the performance confidence factor data, and in response to attenuate the post-echo canceler uplink data to produce the uplink data.

5. The echo canceler circuit of claim 4 wherein the echo power and confidence estimator logic further includes:
a residual echo power estimator data generator, operatively coupled to the downlink activity and double talk probability data generator and the uplink data attenuator, and operative to receive the downlink activity data and the double talk probability data, and in response to produce the residual echo power data; and
a performance confidence factor data generator, operatively coupled to the downlink activity and double talk probability data generator and the uplink data attenuator, and operative to receive the downlink activity data and the double talk probability data, and in response to produce performance confidence factor data.

6. The echo canceler circuit of claim 1 wherein the downlink activity and double talk probability data generator further includes:
a downlink activity data generator, operatively coupled to the echo canceler stage, and operative to receive downlink data, and in response to produce the downlink activity data; and
a double talk probability data generator, operatively coupled to the echo canceler stage, and operative to receive the pre-echo canceler uplink data and in response to produce the double talk probability data.

7. An echo canceler circuit comprising:
a downlink activity and double talk probability data generator operative to receive pre-echo canceler uplink data and downlink data, and in response to produce double talk probability data and downlink activity data;
an echo canceller adaptive filter operatively coupled to the downlink activity and double talk probability data generator and operative to receive the double talk probability data, the downlink activity data and the downlink data, and in response to dynamically vary a rate of echo cancellation adaptation and to produce echo estimation data;
adder logic, operatively coupled to the echo canceler adaptive filter, and operative to receive the pre-echo canceler uplink data and the echo estimation data, and in response to produce post-echo canceler uplink data; and
echo power and confidence estimator logic, operatively coupled to the adder logic, and the downlink activity and double talk probability data generator, and operative to receive the downlink activity data and the double talk probability data, and in response to produce residual echo power data and performance confidence factor data.

8. The echo canceler circuit of claim 7 wherein the downlink activity and double talk probability data generator further includes:
a downlink activity data generator, operatively coupled to the echo canceller adaptive filter, and operative to receive the downlink data, and in response to produce the downlink activity data; and
a double talk probability data generator, operatively coupled to the echo canceler adaptive filter, and operative to receive the pre-echo canceler uplink data, and in response to produce the double talk probability data.

9. The echo canceler circuit of claim 7 wherein the rate of echo cancellation adaptation is controlled in response to an adaptation gain based on one minus the double talk probability data.

10. The echo canceler circuit of claim 7 including:
a digital to analog converter operative to receive the downlink data, and in response to produce a downlink audio signal;
an amplifier, operatively coupled to the digital to analog converter, and operative to receive the downlink audio signal, and in response to produce an amplified downlink audio signal;
a microphone, operative to receive at least a portion of the amplified downlink audio signal, and in response to produce a pre-echo canceler uplink signal; and
an analog to digital converter, operatively coupled to the microphone, the adder logic and to the downlink activity and double talk probability data generator, and operative to receive the pre-echo canceler uplink signal, and in response, to produce the pre-echo canceler uplink data.

11. A communication apparatus, comprising:
a housing having coupled therewith:
an echo canceler circuit within the housing comprising:
a downlink activity and double talk probability data generator operative to receive pre-echo canceler uplink data and downlink data, and in response to produce double talk probability data and downlink activity data; and an echo canceler stage, operatively coupled to the downlink activity and double talk probability data generator, and operative to receive the downlink data, the pre-echo canceler uplink data, the double talk probability data and the downlink activity data, and in response to produce uplink data; and a transceiver within the housing operatively coupled to the echo canceler stage, and operative to receive the uplink data, and in response to transmit the uplink data.

12. The communication apparatus of claim 11 wherein the transceiver is at least one of: wireless wide area network (WWAN) transceiver and a wireless local area network (WLAN) transceiver.

13. The communication apparatus of claim 11 wherein the communication apparatus is included in at least one of a speaker phone and a telephone.

14. The communication apparatus of claim 12 further including a location information generator operative to produce location information, wherein the echo canceller circuit includes:

one or more processing devices operatively coupled to the location information generator; and memory containing instructions executable by the one or more processing devices to cause the one or more processing devices to provide the location information to the transceiver, wherein transceiver transmits the location information.

15. The communication apparatus of claim 11 wherein the transceiver receives downlink audio data, and in response provides the downlink audio data to the echo canceler circuit.

16. An in-vehicle communication system comprising:
an echo canceler circuit comprising:
a downlink activity and double talk probability data generator operative to receive pre-echo canceler uplink data and downlink data, and in response to produce double talk probability data and downlink activity data;

an echo canceler stage, operatively coupled to the downlink activity and double talk probability data generator, and operative to receive the downlink data, the pre-echo canceler uplink data, the double talk probability data, and the downlink activity data, and in response to produce uplink data;

a wireless transceiver operatively coupled to the echo canceler stage and operative to receive the uplink data and in response to transmit the uplink data;

an audio system including:
an amplifier, operatively coupled to the echo canceler circuit, and operative to receive the downlink data, and in response to produce an amplified downlink audio signal; and a playback stage including at least one of: a tuner stage, a tape player, a CD player, a DVD player and a hard drive, operatively coupled to the amplifier, and operative to provide at least a playback audio signal to the amplifier.

17. The in-vehicle communication system of claim 16 wherein the transceiver is at least one of: a wireless wide area network (WWAN) transceiver, a wireless local area network (WLAN) transceiver, and a wireless device.

18. The in-vehicle communication system of claim 16 wherein the echo canceler stage includes an echo canceller adaptive filter operatively coupled to the downlink activity and double talk probability data generator, and operative to receive the double talk probability data, the downlink activity data and the downlink data, and in response to dynamically vary a rate of echo cancellation adaptation.

19. The in-vehicle communication system of claim 18 wherein the rate of echo cancellation adaptation is controlled in response to an adaptation gain based on the double talk probability data.

20. A method for reducing an echo signal comprising:
receiving pre-echo canceler uplink data and downlink data;
generating downlink activity data in response to the received pre-echo canceler uplink data and the downlink data;
generating double talk probability data in response to the received pre-echo canceler uplink data and the downlink data; and
echo canceling the pre-echo canceler uplink data in response to the downlink data, the downlink activity data and the double talk probability data to produce post-echo canceler uplink data.

21. The method of claim 20 wherein echo canceling the pre-echo canceler uplink data further includes dynamically varying a rate of echo cancellation adaptation when downlink speech is detected based on at least the downlink activity data.

22. The method of claim 21 wherein the rate of echo cancellation adaptation is dynamically varied in response to an adaptation gain based on one minus the double talk probability data.

23. The method of claim 20 including attenuating the post-echo canceler uplink data in response to the downlink activity data and the double talk probability data to produce uplink data.

24. Memory containing instructions executable by one or more processing devices that causes the one or more processing devices to:
receive pre-echo canceler uplink data and downlink data;
generate downlink activity data in response to the received pre-echo canceler uplink data and the downlink data;
generate double talk probability data in response to the received pre-echo canceler uplink data and the downlink data; and
echo cancel the pre-echo canceler uplink data in response to the downlink data, the downlink activity data and the double talk probability data to produce post-echo canceler uplink data.

25. The memory of claim 24 containing executable instructions that cause the one or more processing devices to:
dynamically vary a rate of echo cancellation adaptation when downlink speech is detected based on at least the downlink activity data.

26. The memory of claim 24 containing executable instructions that cause the one or more processing devices to:
attenuate the post-echo canceler uplink data in response to the downlink activity and double talk probability data to produce the uplink data.

* * * * *